United States Patent [19]

Feucht et al.

[11] 3,823,643
[45] July 16, 1974

[54] APPARATUS FOR PRODUCING ARCUATE GROOVES IN A CYLINDRICAL MEMBER

[75] Inventors: Alfred Feucht, Dubendorf; Vincenco Guidi, Baden, both of Switzerland

[73] Assignee: BBC Aktiengesellschaft Brown, Boveri & Cie, Baden, Switzerland

[22] Filed: Dec. 14, 1972

[21] Appl. No.: 315,236

Related U.S. Application Data

[63] Continuation of Ser. No. 58,801, July 28, 1970, abandoned.

[52] U.S. Cl. ................ 90/15 A, 90/11 R, 90/15 B
[51] Int. Cl. ............................................. B23c 3/28
[58] Field of Search ............. 90/15.1 A, 15.1 B, 15, 90/11 R, 11 A, 9.6

[56] References Cited
UNITED STATES PATENTS
1,625,402 4/1927 Sloan ................................ 90/9.6 X Primary Examiner—Gil Weidenfeld
Attorney, Agent, or Firm—Pierce, Scheffler & Parker

[57] ABSTRACT

The method of machining a profiled arcuate groove such as on the rotor of a turbo-machine to provide a mounting for the rotor blading comprises the steps of advancing into the groove a cutting head having two rotary cutters the respective cutting edges of which are directed in opposite directions and simultaneously machine the opposite flanks of the groove, gradually increasing the spacing between the cutting edges as machining of the groove flanks progresses and thereafter decreasing the spacing between the cutting edges in conjunction with extraction of the cutters from the groove.

10 Claims, 8 Drawing Figures

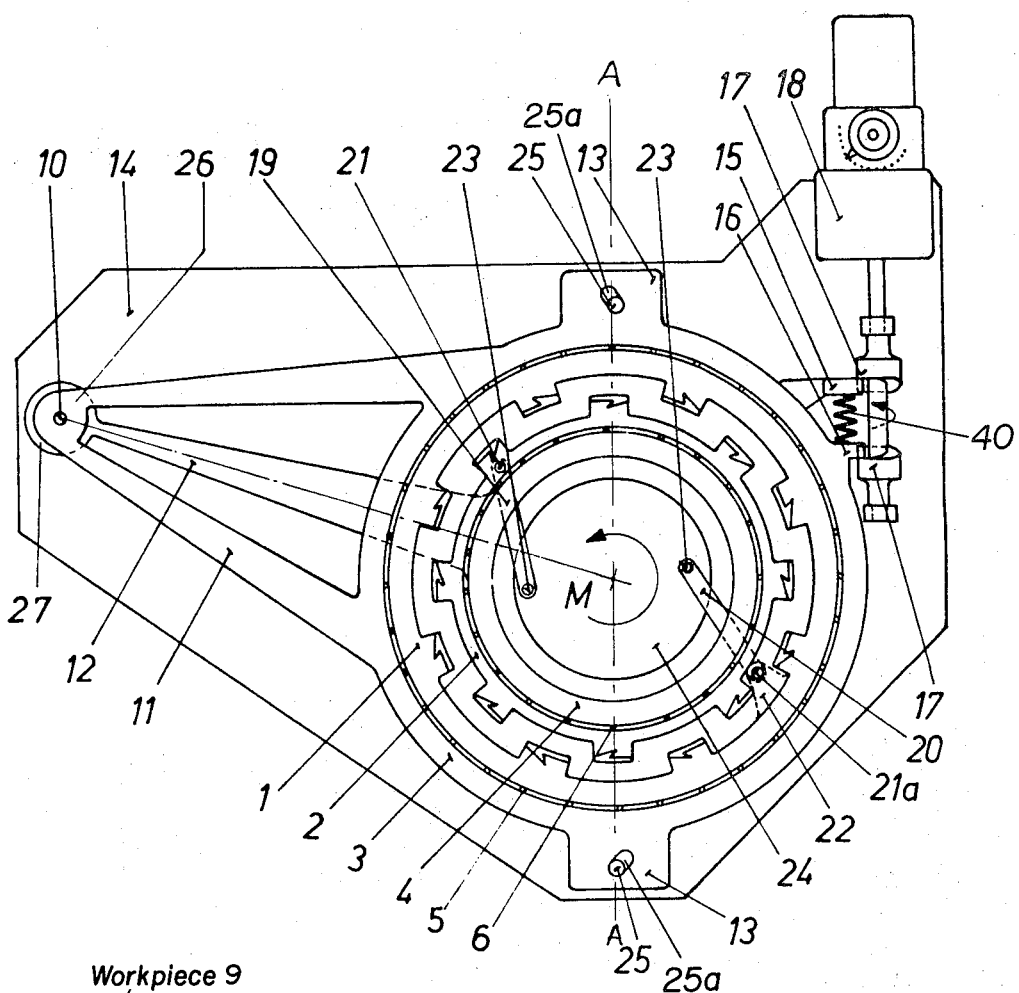
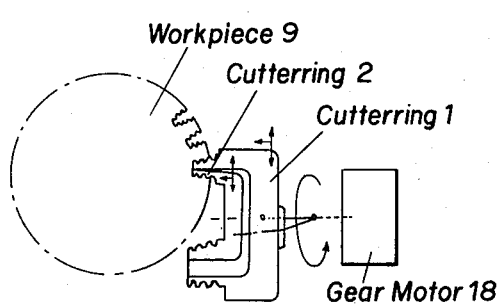
Fig. 4
Fig. 8

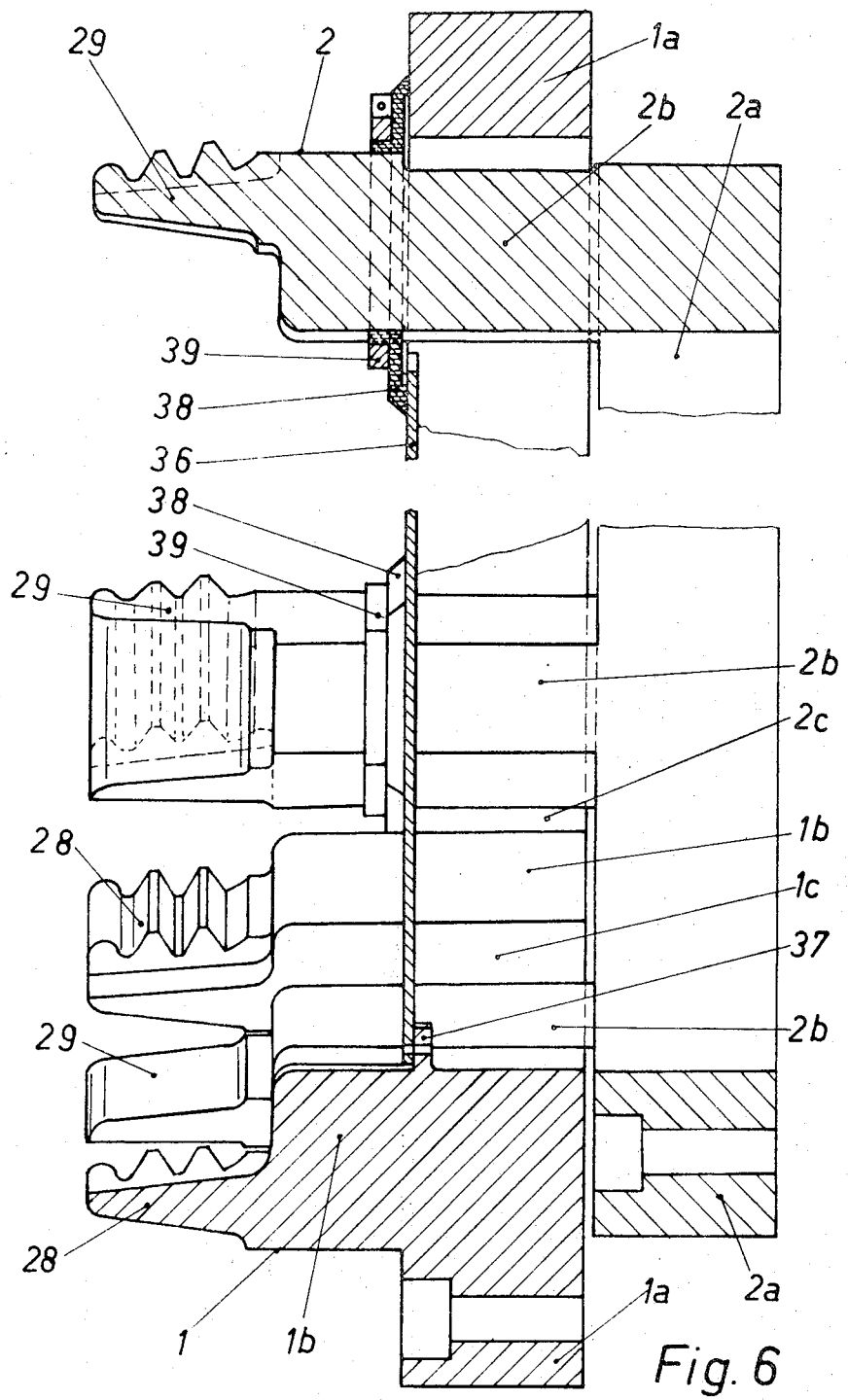

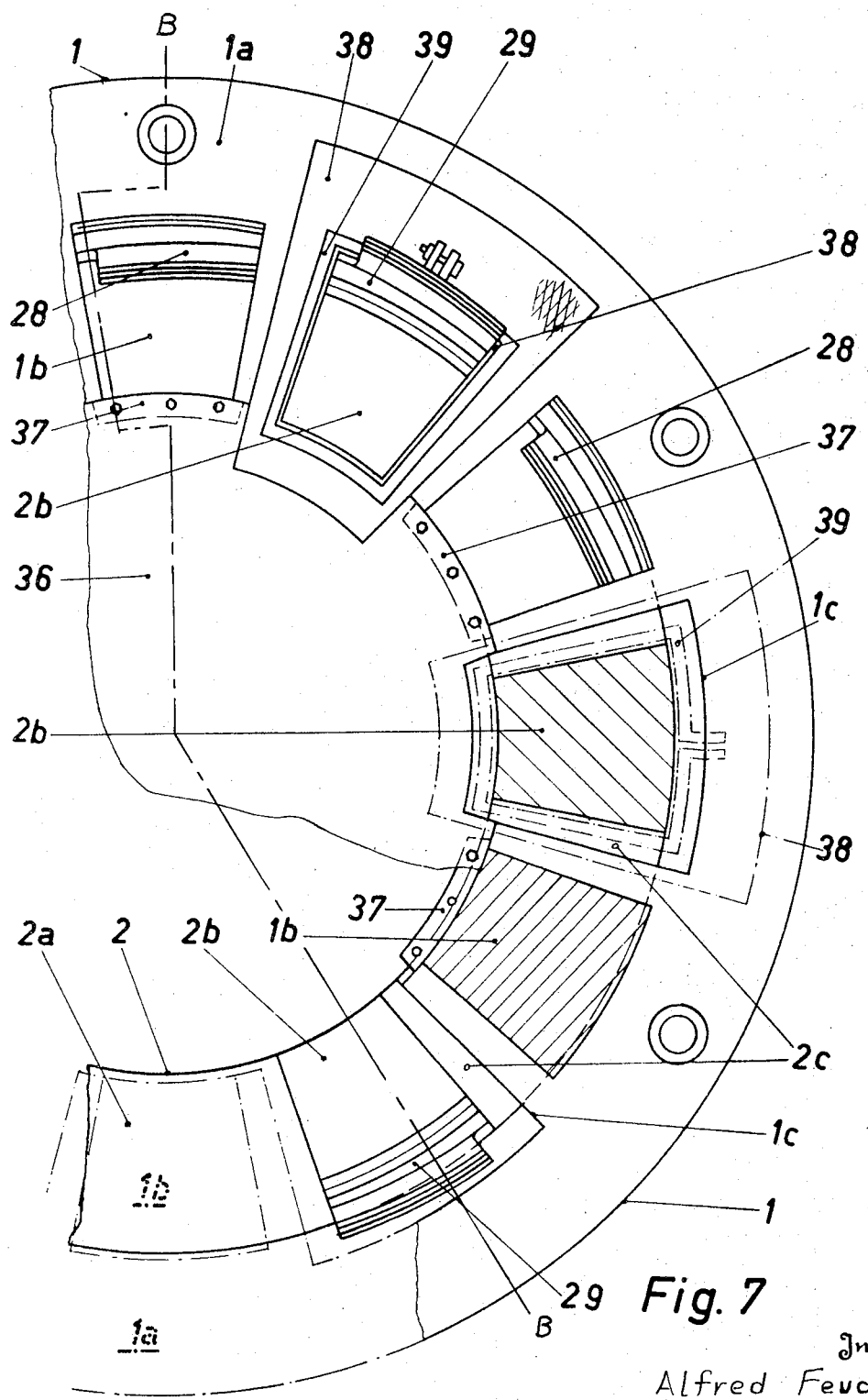

3,823,643

APPARATUS FOR PRODUCING ARCUATE GROOVES IN A CYLINDRICAL MEMBER

This is a continuation of application Ser. No. 58,801 filed July 28, 1970 now abandoned.

The invention relates to a method and apparatus for producing relieved, arcuate grooves, extending approximately in the direction of the generatrix of a rotating member. Such grooves may be blade mounting grooves on the rotor of a turbo machine.

It is known to machine profiled grooves, extending along a circular arc, by means of milling. To this end, a shank end milling cutter, disposed in a tool headstock, is pivoted in a radius so that its feed motion describes a circular arc and the teeth of the shank end milling cutter machine one groove flank. During the pivoting motion in the opposite direction the teeth will remove stock from the other groove flank. This method of operation requires long operating periods for producing grooves since the shank end mills can operate only with a very small feed and a small depth of cut. Moreover milling cutters frequently suffer damage due to one-sided loading of the shank if the relief to be produced is large relative to the groove width.

It is an object of the present invention to provide an improved method and apparatus for producing arcuate grooves.

In accordance with the present invention a method of producing a groove extending approximately in the direction of the generatrix of a rotating member and having its flanks at different radial distances from the rotational axis, comprises advancing into the groove a peripheral portion of a cutting head having two rotary cutters which travel along said peripheral portion and which respectively have cutting edges directed in opposite directions and arranged so that the cutting edges of one rotating cutter machine one flank of the groove simultaneously with the machining of the other flank by the cutting edges of the other rotating cutter, gradually increasing the spacing between the cutting edges as machining of the groove flanks progresses, and extracting the peripheral portion of the cutting head from the groove after once again decreasing the spacing between the cutting edges in the peripheral portion.

To carry out the above invention there is provided apparatus for producing arcuate grooves comprising a headstock having a drive shaft and two separate circular cutter seating bearings for carrying respective rings of cutters one within the other so that one cutter ring can machine an inside flank of a groove while simultaneously the other cutter ring is machining the outside groove flank, the two seating bearings being rotatably driven from the shaft by a mechanism adjustable between a first condition at which the rotational axes of the cutter rings are close to one another or colinear, and a second condition at which the rotational axes of cutter rings are spaced to facilitate withdrawal of the cutter rings from the machined groove.

The underlying principle of the invention which enables substantial reductions in time to be made, is that the machining circles of respective rings of cutters are within each other and cover both groove flanks while simultaneously removing stock in the groove range. The distance along the normal between the circumferential lines of the machining circles is adapted to be variable by mutual displacement of the associated axes of rotation.

Preferably the machining circles of the rings of cutters are pivotable about a fixed pivot axis of rotation which is disposed outside the machining circles. This enables the machining circles to be pivoted in simple manner during stock removal from a non-coaxial into a coaxial position.

A preferred embodiment of the apparatus is so constructed that each of the cutter seating bearings is mounted in its own support ring which is provided with a hinged pivoting arm. Each arm is pivotably journalled through an aperture at its end on a stationary pin defining the pivot axis, and means are provided for guiding the mutually displaceable bearings upon a common baseplate. Suitably the baseplate is provided with an element for controlling the feed of the cutter rings from a non-coaxial starting position into a coaxial limiting position during the stock removal operation and for once again returning the two cutter rings into the starting position after the machining operation is completed.

Preferably the cutter rings provide cutting heads and are disposed in parallel planes and suitably have recesses to enable root portions of the teeth of the second cutter ring to extend between the tooth root portions of the first cutter ring. Likewise the tooth root portions of the first cutter ring extend between the tooth root portions of the second cutter ring so that the tooth root portions of the two cutter rings intermesh in the manner of a gear during the rotating motion but without any physical surface contact with one another.

The invention will now be described in more detail, by way of example, with reference to the accompanying drawings, in which:

FIGS. 3 and 4 show a tool headstock at the beginning of operation and at the end of a stock removal pass, respectively;

FIG. 6 is a section, partly broken away, through two cutter heads removed from the headstock, the section extending along the line B—B shown in FIG. 7;

FIG. 7 is a plan view of parts of the two cutter heads sectioned in FIG. 6 and seen from the side facing a groove being machined; and FIG. 8 is a somewhat diagrammatic view showing the workpiece 9, a peripherally grooved rotor, and the manner in which the dual rotary cutter rings simultaneously finish-machine the opposite flanks of each of the pre-machined grooves in the rotor.

Corresponding parts are referenced with the same numerals in FIGS. 1 to 7.

Figure 1:
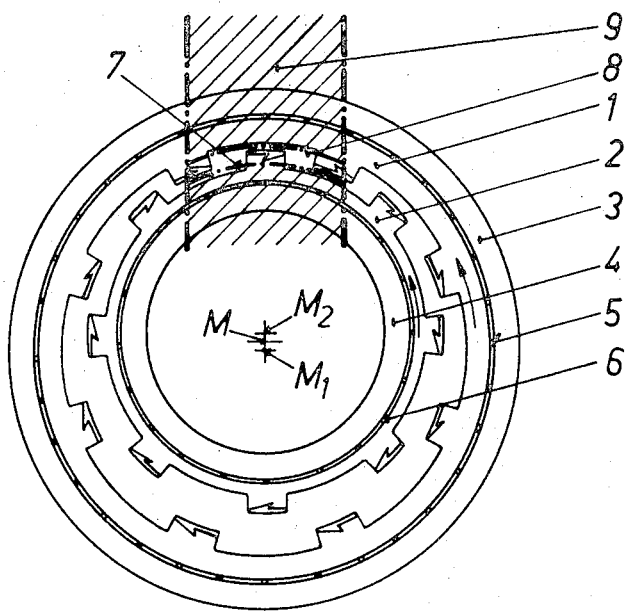
FIGS. 1 and 2 show a diagram of the operating method using two cutter members constructed as rings of cutters and respectively at the beginning and at the end of a stock removed pass.

FIG. 1 discloses a workpiece 9, symbolised by a thick dot-dash line, the two groove flanks 7 and 8 being also indicated by lines. The cutter ring, shown in diagrammatic form, is rotatably mounted within a supporting ring 3 by means of a bearing 5 for introduction into the pre-machined groove 7, 8. Bearing 5 can be of the roller or ball bearing type or it is also possible to use a journal type bearing. The cutter ring is introduced by a feed motion of the entire tool headstock in a direction which is normal relative to the generatrix of the workpiece.

The second cutter ring 2 of smaller diameter is also shown in diagrammatic form and is disposed geometrically within the first cutter ring 1 which has the larger diameter. The cutter ring 2 is introduced simultaneously with the cutter ring through the above described feed motion into the premachined groove, whereupon the two cutter ring touch the two flanks 7 and 8 by virtue of rotation which is accompanied by stock removal.

In the infeed position disclosed in FIG. 1 it will be seen that the axes of rotation of the cutter rings 1 and 2 are referenced with $M_1$ and $M_2$ and are disposed in a non-coaxial position.

Figure 2:
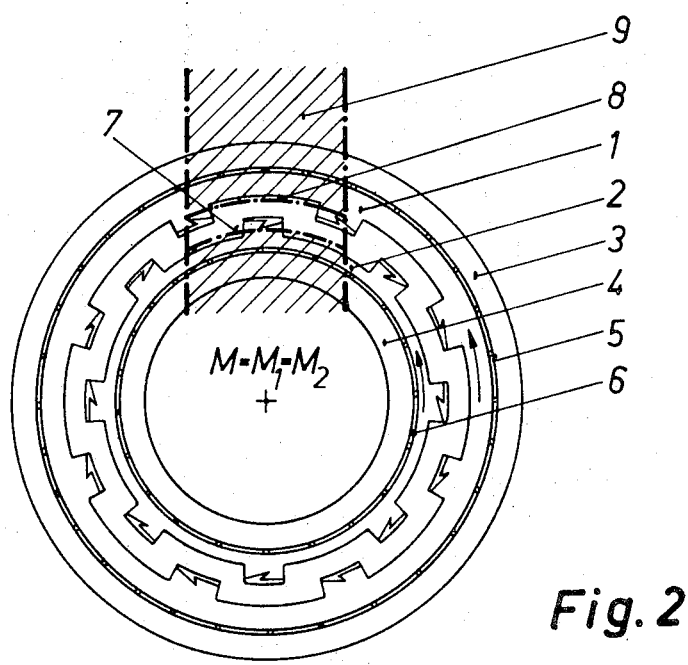

FIG. 2 shows a diagram of the operating method corresponding to FIG. 1. The difference between the two figures is due to the displacement of the two machining circles of the cutter ring 1 and 2 which takes place during the feed motion. The displacement of the axes of rotation $M_1$ and $M_2$ is torminated when said two axes are positioned coaxially. Accordingly, it follows that the profile at this moment of time will have the final dimensions of the groove flanks 7,8.

The two cutter rings 1 and 2 are then returned into the starting position and are traversed out of the groove of the workpiece 9 in the same way as for the feed motion but in the opposite direction.

Figure 3:
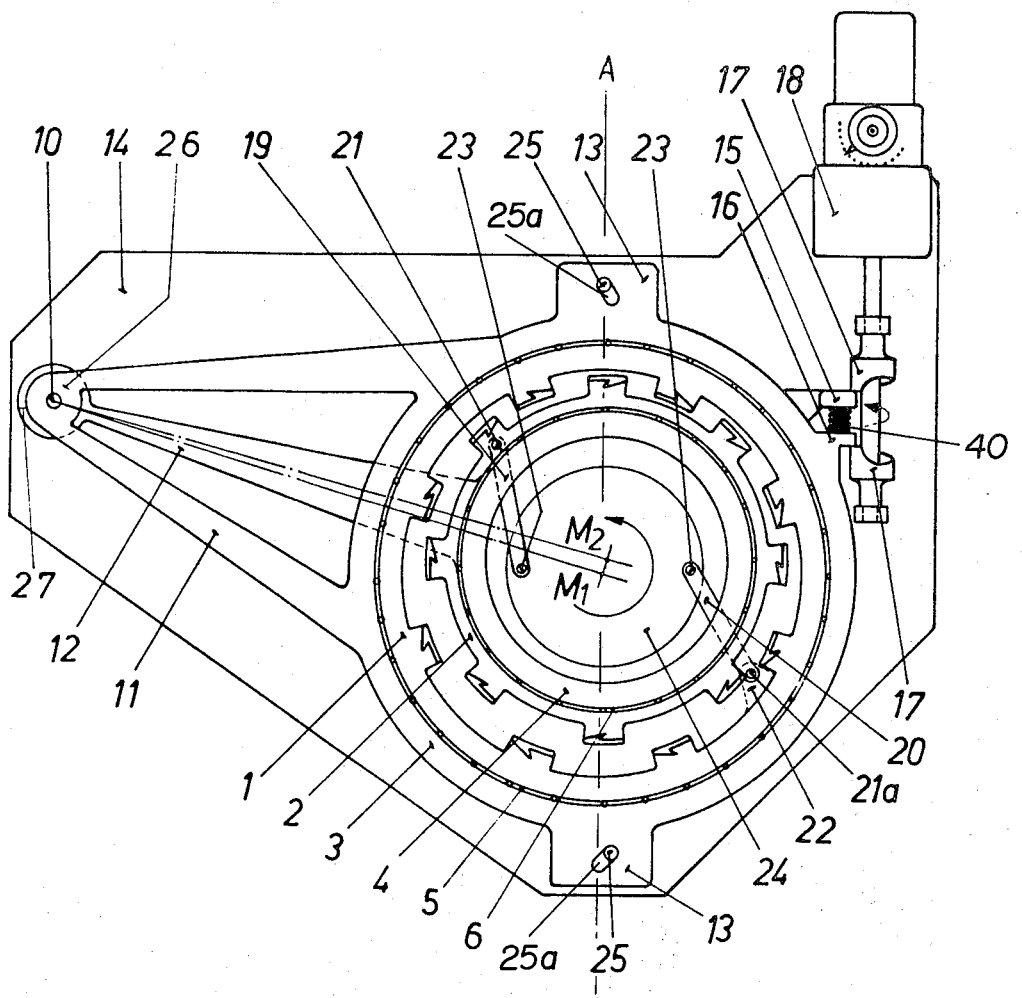

FIG. 3 shows one embodiment of a cutter head of the kind which may be mounted on the headstock of a conventional plain milling machine. The two cutter rings 1 and 2 are rotatably supported as indicated in FIGS. 1 and 2 by means of bearings 5, 6 in the carrier rings 3,4. Pivoting arms 11, 12, which are independent of each other are joined to the carrier rings 3, 4, the second end of the pivoting arms being formed by one boss bearing 26, 27 each. The boss bearings 26, 27 are rotatably disposed on a bearing pin 10, mounted on a baseplate 14, the bearing pin forming the pivoting point for the two carrier rings 3 and 4 which are pivotable relative to each other. Base plate 14 is mounted on the headstock, not shown, of the milling machine so as to enable the rotatable cutter rings 1 and 2 and their various supporting components later described in further detail to be traversed into and out of the grooves of the work piece whose flanks are to be milled respectively by the two cutter rings. The circumferences of the rings are each provided with extensions, two of which are shown at 13, for guiding the rings, the extensions having guide slots 25G. The guide slots 25G are adapted to receive pins 25 which are also mounted on the baseplate 14. This ensures accurate guiding of the displacement motion and prevents the two carrier rings from lifting off each other and ensures that they bear upon the baseplate 14.

Claws 15 and 16 with a compression spring 40 inserted therebetween adapted to transmit a feed motion from a gear motor 18 through cylinder cams 17 on to the carrier rings and thus automatically displace the cutter rings 1, 2, are formed on the two carrier rings 3, 4.

The rotating motion or the torque is taken off from a drive shaft, not shown in FIG. 4, having the axis M to which a driver disc 24 is coupled. The cutter heads 1 and 2 are set into rotation by means of bolts 23, mounted in the driver disc 24 and by means of links 19 and 20, movably disposed on said bolts. The second end of the drag link 19 is directly coupled through a bolt 21 to the cutter ring 2. By contrast, the corresponding end of the drag link 20 is connected via a bolt 21a mounted in an extension 22, to the cutter ring 1, the extension 22 being provided for compensating the different radii of the cutter rings.

FIG. 4 shows the coaxial position in which the relieved arcuate grooves are machined with the same tool headstock as in FIG. 3, the axes of rotation $M_1$ and $M_2$ of FIG. 3 being coincident with the designated axis M. This position also refers to the end position of the feed and stock removal. The cylinder cams 17 regulate the feed velocity by the rise of the cam tracks and control the feed by the level difference of the cam tracks. They also perform the function of returning the cutter rings into the starting position after the aforementioned end position is reached, the cutter rings being traversed out of the groove in the starting position.

Figure 5:
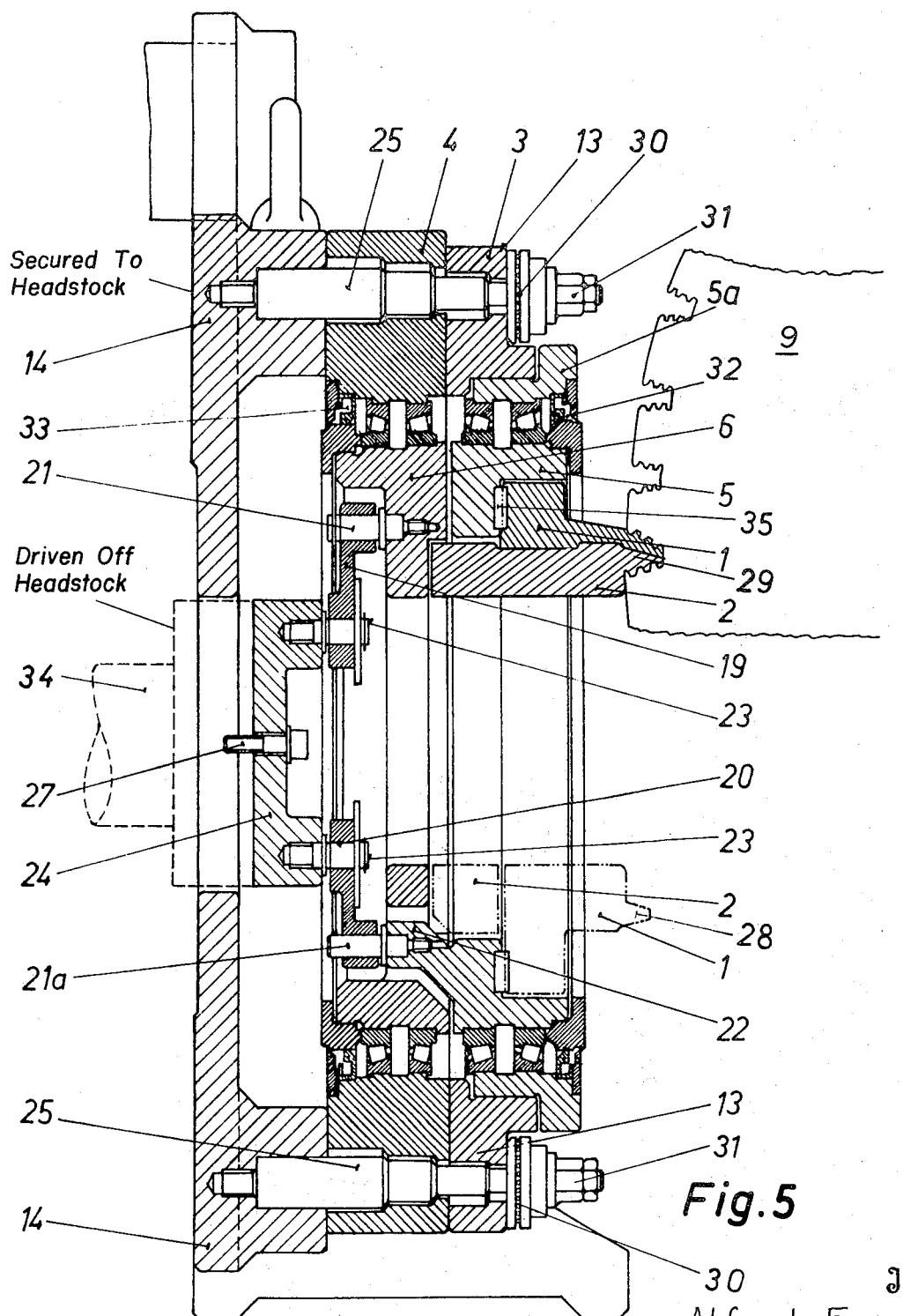
FIG. 5 is a vertical section through a tool cutter head illustrated in FIGS. 3 and 4 and taken along the line A—A but to an enlarged scale.

FIG. 5 shows a section through the tool headstock, the cutting plane being indicated by the guide bolts 25, mounted on the baseplate 14 and in this case being screw-mounted.

The carrier rings 3 and 4 which are displaceable relative to each other are so disposed that the carrier ring 4 can slide on the baseplate 14 and the carrier ring 3 is slidably displaceable on the carrier ring 4. Further bearing elements 30 and mounting means, for example screw-threaded nuts 31 stress the carrier rings 3, 4 to the baseplate 14 without obstructing the relative sliding motion of the parts. The first carrier ring 3, in this case the leading ring, is provided with a bearing ring seat 5 for the interior and 5a for the exterior. These in turn form the inner and outer bearing seats respectively and also serve to accommodate sealing means 32 which are installed between the two rings. An outer bearing ring seat is not necessary in the other carrier ring 4 since the outer bearing seat is provided in the carrier ring 4 itself. One bearing ring seat 6 is provided with the inner bearing seat and sealing means 33 are once again disposed between the carrier ring 4 and the bearing ring seat 6.

The bearing ring seats 5 and 6 are mechanically coupled to a drive shaft 34 via the driver disc 24 mounted on the shaft by means of a bolt 27. The bolts 23, screwed into the driver disc 24 and the bolts 21 on which the drag levers 19 and 20 are rotatably disposed transmit the rotation of the disc 24 towards the carrier ring 3 and 4.

The purpose of the extension 22 becomes immediately apparent from FIG. 5, as, since the two bearing ring seats 5, 6 are disposed at unequal distances from the driver disc 24, it is necessary to provide the seat 5 with the extension 22 into which the bolt 21 is screw-mounted. The drag levers 19 and 20 are secured against axial displacement by means of circlips provided on the bolts and which are shown but not referenced.

The bearing ring seats 5 and 6 have respectively mounted upon them the actual cutter rings 1 and 2 and for the adjustment and centring thereof. In this illustration the two cutter rings are indicated merely by a dot-dash contour line, keys 35 providing for the driving of each cutter ring. Each of the cutter rings is secured to each of the bearing ring seats 5 and 6 by means of screws whose circumferences are thickened. On the one hand this provides interchanging facilities to enable a different cutter ring to be used while on the other hand precision adjustment of the two cutter rings 1 and 2 relative to each other is made possible in a simple manner.

FIG. 6 shows a section through the cutter rings 1 and 2, a fundamental distinction being made between three principal parts on the cutter rings. On the cutter ring 1, the ring portion 1a forms the basic element in which bolt holes for securing it to the ring seat 6 are provided. The ring 1a has a tooth root portion 1b on which is mounted a toothed part 28. In the cutter rings 2 there is a ring portion 2a and a tooth root portion 2b, while a toothed part 29 has its cutting edges on the external circumference. The cutting edges of the tooth part 28 are of course disposed on the internal circumference as shown. Each ring thus carries a ring of cutters or teeth.

A further difference between the two cutter rings 1, 2 is that the ring portion 1a is provided on the internal circumference with recesses 1c for the partial accommodation of the tooth root portions 2b of the second cutter ring 2. By contrast, no recesses are provided in the ring portion 2a of the cutter ring 2, the space remaining between the tooth root portions 2b being partially filled by the tooth root portions 1b.

By way of brief summary, the base plate 14 on which is mounted the entire tool assembly constructed in accordance with the invention, is secured to and thus becomes a part of the otherwise conventional headstock structure of a conventional milling machine so as to be traversable therewith thereby to enable the tool assembly providing the rotatable cutter rings 1,2 to first be moved into the groove of the workpiece the flanks of which are to be milled respectively by the rings, and then out of the groove so as to enable the flanks of the next groove in the workpiece to be milled. As shown in FIG. 5, shaft 34 the drive for which is taken off the headstock effects rotation of driver disc 24 which in turn effects rotation of cutter ring 1 within its carrier ring 3 via link 20, and rotation of cutter ring 2 within its carrier ring 4 via link 21. As shown in FIGS. 1 to 4, carrier ring 3 for the rotatably driven cutter ring 1 is integrated into pivot arm 11, and carrier arm 4 for the rotatably driven cutter ring 2 is integrated into pivot arm 12. Both arms 11 and 12 have a common pivot axis 10 to furnish one support point therefor. A second support point for each such integrated structure 3, 11 and 2,12 is provided by claw 15 on carrier ring 4 and claw 16 on carrier ring 2 with the compression spring 40 therebetween, the two claws functioning as cam follower surfaces riding on the upper and lower cams 17 driven by motor 18 so that as cams 17 rotate, the claws 15, 16 and hence carrier rings 4 and 3 are shifted about their common pivot axis 10 from the position shown in FIGS. 1 and 3 where the respective axes $M_2$ and $M_1$ of rotation of the circular cutter rings 2 and 1 are non-coaxial, which is the starting position, into a co-axial limiting position as shown in FIGS. 2 and 4 during the stock removal operation, and for once again returning the stock removal operation, and for once again returning the outer rings into the non-coaxial starting position after the machining operation is completed.

The motions performed by the two cutter ring could be described as the intermeshing of an internally toothed gear ring with an externally toothed pinion, there being however no common surface of physical contact since a free space always remains between the cutter part root portions 1b and 2b and the appropriate recess 1c and 2c.

The cutter ring 1 is also provided with strips 37 on which a cover plate 36 is mounted. Frame seals 38, secured by compression edges 39 on the tooth root portion 2b, frame the tooth root portions 2b of the cutter ring 2. Each frame seal is mounted so as to be movably slidable on the cover plate 36 and its size must be such as to permit the maximum possible relative travel between the two cutter rings without exposing the tooth root portions 2b. Complete covering of the two cutter rings 1, 2 relative to a groove being cut is necessary to prevent the ingress of swarf into the gap between the cutter ring 1 and the cutter ring 2 as this may result in obstruction for the different rotating parts.

FIG. 7 is a plan of part of the two cutter rings 1, 2 the recesses 1c of the cutter head 1 being more readily recognisable. The cutter ring 2, which trails behind the previously mentioned cutter ring in this illustration, extends through the recesses 1c with its tooth root portions 2b while the tooth root portions 1b of the first cutter ring 1 extend through the gaps 2c formed between the tooth roots 2b.

By virtue of the fact that the cover 36 is constructed to be movable, the strips 37 are disposed only over the internal arc of each tooth root 1b on which the cover plate 36 is mounted, for example by means of rivets or splino pins. On the internal and external part of the arc, the resilient frame seals 38 are wider than the parts extending in the radial direction since sliding travel due to axial displacement is greatest when measured in the radial direction.

It is preferred for the tooth root portions 1b, 2b to be adapted for individual mounting on the ring portions 1a and 2a to avoid the need for exchanging the entire cutter head if different profile forms have to be machined.

Another convenient arrangement is to arrange for tooth parts, such as tool tips to be inserted in and mounted on the tooth portions 28, 29 in conventional manner, for example by screw mounting or by brazing.

The advantages obtained by the above-described construction are not merely economical due to the reduced machining time but are also due to the fact that a promachined groove can be finish-machined by a single operation on both flanks 7, 8, such simultaneous machining completely eliminating profile displacement and substantially simplifying the measuring methods.

We claim:

1. Apparatus for finish-machining the flanks of circumferentially spaced arcuate grooves which have been premachined into the periphery of a rotor and wherein said grooves extend approximately in the direction of the generatrix of said rotor which comprises:
   a headstock having a drive shaft and two separate circular cutter seating bearngs, said seating bearings being located one within the other,
   a cutter ring carried by each seating bearing thereby enabling one cutter ring to support cutter teeth means for finish-machining one flank of the groove while the other cutter ring supports cutter teeth means for finish-machining the opposite flank of the groove, and
   adjustable means for pivoting said seating bearings from said drive shaft,
   said seating bearing pivoting means being adjustable between a first condition at which the rotational axes of said cutter rings are substantially collinear, and a second condition at which the rotational axes of said cutter rings are spaced to facilitate withdrawal of said cutter rings from the finish-machined groove.

2. Apparatus as defined in claim 1 for finish-machining a groove wherein said adjustable means for rotatably driving said seating bearings from said drive shaft includes a pair of arms each extending from a common pivot point on a base plate to respective carrier rings arranged one upon the other on said baseplate, said circular seating bearings being respectively rotatably mounted within said carrier rings which are also provided with guiding means confining their movement, when said arms are moved, to predetermined paths which alter the spacing between arcuate portions of said cutter rings in a predetermined peripheral cutting zone of said headstock.

3. Apparatus as defined in claim 2 for finish-machining a groove wherein said guiding means for confining the movement of said carrier rings to alter the spacing between arcuate portions of said cutter rings comprises means adjustably varying the spacing between two claws, one on each of said carrier rings, which are spring-urged apart and which respectively effect movement of said carrier rings.

4. Apparatus as defined in claim 3 for finish-machine a groove wherein said means which adjustably vary the spacing between said claws includes a cam on each claw, and electro-mechanical drive means for rotating said cam to vary the interclaw spacing.

5. Apparatus as defined in claim 3 for finish-machine a groove wherein said claws are attached respectively to said carrier rings on their sides opposite said pair of arms.

6. Apparatus as defined in claim 1 for finish-machine a groove and which includes a pair of drag links extending respectively from said cutter seating bearings to a driving boss rotated by said drive shaft.

7. Apparatus as defined in claim 1 for finish-machining a groove wherein said cutter seating bearings support said cutter rings for rotation in parallel planes, said cutter teeth means on each said cutter ring having peripherally distributed spaced cutting teeth extending substantially parallel to its axis and formed with a root portion and profiled cutting tip, all of said profiled cutting tips lying in a single plane extending parallel to the planes of said cutter rings, the cutting teeth of one ring presenting inwardly directed cutting edges and the cutting teeth of the other ring presenting outwardly directed cutting edges, the root portions of the teeth attached to the ring farthest from said single plane passing with a clearance between the root portions of the teeth of the other ring whereby the root portions of the teeth of the two rings alternate with one another around a circle.

8. Apparatus as defined in claim 7 for finish-machinining a groove wherein said profiled cutting tips of the teeth are individually replaceable.

9. Apparatus as defined in claim 7 for finish-machining a groove wherein said profiled cutting tips of the teeth on each cutter ring are individually replaceable.

10. Apparatus as defined in claim 1 for finish-machining a groove and which further includes a cover plate covering the annulus of said cutter seating bearings to prevent imgress of swarf from said cutter rings, and frame seals slidable on said cover plate to permit relative movement of said cutter seating bearings without impairing the effectiveness of said cover plate and frame seals in preventing ingress of swarf to said cutter seating bearings.

* * * * *

UNITED STATES PATENT OFFICE
CERTIFICATE OF CORRECTION

Patent No. 3,823,643     Dated July 16, 1974

Inventor(s) Alfred Feucht and Vincenco Guidi

It is certified that error appears in the above-identified patent and that said Letters Patent are hereby corrected as shown below:

[30] Foreign Application Data

July 31, 1969 - Swiss patent Application

No. 11662/69

Claim 1, line 7 "bearings" (first occurrence) should be spelt thus -

Claims, 4, 5 and 6 delete "machine" and insert:

- machining -

Claim 10, line 4 spell "ingress" thus .

Signed and sealed this 8th day of October 1974.

(SEAL)
Attest:

McCOY M. GIBSON JR.      C. MARSHALL DANN
Attesting Officer          Commissioner of Patents